United States Patent Office

3,440,273
Patented Apr. 22, 1969

3,440,273
CURABLE LIQUID POLYTHIOPOLYMERCAPTAN-POLYURETHANE POLYMERS
Eugene R. Bertozzi, Yardley, Pa., assignor to Thiokol Chemical Corporation, Bristol, Pa., a corporation of Delaware
No Drawing. Filed Oct. 23, 1965, Ser. No. 504,247
Int. Cl. C08g 41/04, 43/02
U.S. Cl. 260—471                                            4 Claims

ABSTRACT OF THE DISCLOSURE

A new class of curable liquid polythiopolymercaptanpolyurethane polymers is described. These polymers, which are liquid at 100° C., are prepared by interpolymerizing one or more (a) liquid disulfide-containing polyols having a molecular weight in the range from 150 to 15,000, (b) polyisocyanates having a molecular weight in the range from about 150 to 1,000, and (c) polymercaptans having a molecular weight in the range from about 90 to about 1,000, using quantities such that the ratio of hydroxy groups to isocyanate groups is 1:1 and the ratio of mercaptan groups to disulfide linkages (which is present in the disulfide-containing polyol) is in the range from 4:1 to 1:130. The polymerization reaction may be conducted either by first reacting the disulfidecontaining polyol with the polyisocyanate and then reacting the resultant polyurethane with the polymercaptan, or by reacting all of the components at the same time. The liquid polythiopolymercaptanpolyurethane polymers undergo oxidative curing to form solid elastomeric polymers.

---

This invention relates to a process for forming liquid or easily meltable polythiopolymercaptan polymers which contain at least one disulfide linkage, some urethane linkages and a plurality of mercaptan groups. It further relates to the oxidatively curable liquid or easily meltable polymer products formed thereby.

Liquid or easily meltable polythiopolymercaptan polymers of the prior art have been formed, according to Patrick et al. in U.S. Patent 2,466,963, by a chemical cleavage of solid disulfide-containing organic polymers with inorganic sulfur-containing salts in aqueous media, or according to Fettes et al. in U.S. Patent 2,875,182, by the reaction of organo-polychlorides with inorganic sulfur-containing salts in aqueous media. The foregoing processes require a subsequent separation of the polymer products from the aqueous medium used in their formation, and provide large quantities of waste water rich in large quantities of waste inorganic salts which were formed as the reaction byproducts. The prior art such as may be seen by reference to the patents listed in Table I, has disclosed in a fusion of the sulfur and isocyanate arts the formation of sundry polymeric products which polymers contain both sulfur and isocyanate derived linkages in the polymeric backbones.

Table I

| U.S. Patent: | Inventors |
|---|---|
| 2,814,600 | Mitchell |
| 2,879,250 | Eisenmann et al. |
| 2,929,794 | Simon et al. |
| 2,948,707 | Benning |
| 2,957,845 | Wesp |
| 2,989,512 | Nischk et al. |
| 2,998,413 | Holtschmidt et al. |
| 3,027,353 | Holtschmidt et al. |
| 3,054,757 | Britain |
| 3,055,845 | Merten et al. |
| 3,058,955 | Neumann et al. |
| 3,061,574 | Smith |
| 3,077,464 | Simon et al. |
| 3,144,734 | Gobran et al. |
| 3,169,119 | Dankert et al. |

The art which discloses sulfur and isocyanate formed polymers, for the most part, provides solid polymeric end products which are not easily meltable, i.e., cannot be melted to a chemically stable liquid at or below 100° C., and which do not contain a plurality of mercaptan groups through which they may be oxidatively cured by formation of disulfide linkages. The Gobran patent, U.S. 3,114,734, is an exception to this, however, wherein liquid urethane prepolymers, i.e., liquid polymers containing a plurality of urethane linkages and isocyanate groups, are capped with non-polymeric polymercaptans or non-polymeric mercaptoamines to provide oxidatively curable mercaptan-terminated urea or thiourethane linked polyester or polyether polyurethanes. The Gobran liquid polymers, however, are not liquid polythiopolymercaptans being devoid of disulfide linkages, which disulfide linkages are essential to the process and compositions of the present invention. Thus, it is an object of this invention to provide novel oxidatively curable liquid or easily meltable polythiopolymercaptan polymers. Another object of this invention is to provide a novel process for preparing oxidatively curable liquid or easily meltable polythiopolymercaptan urethane polymers. Yet another object of this invention is to provide a novel process for preparing oxidatively curable liquid or easily meltable polythiopolymercaptan polymers which does not produce water or inorganic salts as wastes or byproducts. Other desirable objects of this invention are inherent in or will become apparent from the following descriptions, explanations and examples.

Polymers formed according to the invention are liquids at common room temperatures, i.e., 20 to 50° C., or are easily meltable to form chemically stable liquids at or below 100° C. Further, the instant polymers are oxidatively curable to form useful polymeric solids such as elastomers or coatings according to the oxidative curing methods revealed in the polythiopolymercaptan art, as by Patrick et al. in U.S. 2,466,963. The polymers are characterized by the presence of an average of at least one disulfide linkage and a plurality, i.e., at least two per molecule, of mercaptan groups and at least occasionally a urethane linkage. The preferred polymers of the invention have average molecular weights in the range of from about 1,000 to about 15,000.

The process for forming polymers of the invention comprises two types of reactions. Type 1 comprises reaction of one or more liquid dsulfide-containing polyols of from 150 to 15,000 molecular weight wtih one or more polyisocyanates of from about 150 to 1,000 molecular weight in an inert environment, that is to say a nonalkaline environment that is otherwise substantially devoid of active hydrogen bearing materials which are reactive according to the Zerewitinoff method as described by Kohler in J. Am. Chem. Soc., 49, 3181 (1927). The ratio of polyol and polyisocyanate reactants which is used in the present process is critical to its practice, and is 1/1, that is to say one hydroxyl equivalent weight of polyol for each isocyanate equivalent weight of polyisocyanate. The polyol is chain extended by the polyisocyanate with urethnae linkages, using this ratio of reactants to form a non-ending urethane chain extended polymer intermediate of repeating units having a unit weight that is substantially the sum of the molecular weights of the polyol and polyisocyanate reactants. Type 2 reactions are pursued at any time prior to, concurrent with and/or subsequent to the Type 1 urethane chain extension reaction, according to the invention, while the reactant system is still liquid at the reaction temperature. Therein, a liquid or easily meltable polymercaptan having from 2 to 4 mercaptan groups is added to and reacted with the polyol reactant and/or its urethane chain extended polymer intermediate. The useful polymercaptans have molecular weights in the range of about 90 to 1,000. According to the invention, a critical range of quantities of polymercaptan is employed, and is from 4/1 to 1/130 mercaptan equivalent weights of polymercaptan to disulfide equivalent weights of polyol reactant. The process reactions are conducted at a temperature in the range of 20° to 150° C., and continued at least until all isocyanate and hydroxyl groups have disappeared, say from about 1 to 200 hours, the specific reaction time depending upon the nature of the specific reactants and reaction temperature employed. The polymeric products so provided are liquid or easily meltable solid polythiopolymercaptans that are of prescribable average molecular weight, contain a plurality of mercaptan groups, and on the average contain at least one disulfide linkage. Invariably at least some of the ploymer molecules contain urethane linkages.

The polymer products thus provided may be oxidatively cured to form useful solids, such as polysulfide elastomers by the methods taught in the art for the oxidative curing of conventional polythiopolymercaptans.

Although the mechanisms of the complex reactions which occur in the instant process are not fully understood, it is believed that the most probable course of polymer formation may be as is pictured in the equations and descriptions below wherein, for the sake of simplicity, the polyol is a dithiodiol, i.e., a compound having one disulfide linkage and two hydroxyl groups, the polyisocyanate is a diisocyanate and the polymercaptan is a dimercaptan.

Type 1.—Urethane linkage chain extension

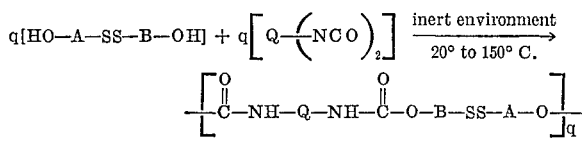

The organic polyvalent groups Q, A and B are substantially inert, that is to say nonalkaline and unreactive with isocyanate, and may be alkylene, arylene, alkarylene or aralkylene, the same or different, wherein the carbon chains of which may be interrupted by ether, thioether or olefinic linkages, and may have pendant thereto halogen atoms or alkyl or aryl groups the chains of which do not exceed about 25 carbon atoms.

The Type 2 reactions which occur may be pictured as shown.

Type 2.—2A-mercaptan-disulfide interchange

In Reactions 2A and 2B, the organic polyvalent groups Q, A and B are as were previously defined, and the organic polyvalent group M is smilarly defined.

According to the process of the invention, prior to, concurrent with and/or subsequent to the formation of Type 1 reaction products, the mercaptan-disulfide interchange reaction may occur, i.e., Reaction 2A. Therein, a mercaptan group reacts with a disulfide linkage to cleave the mercaptan at its hydrogen to sulfur bond and to cleave the disulfide at the sulfur to sulfur bond. The polyol or its urethane chain extended polymer intermediate thus is cleaved into two parts at a sulfur to sulfur bond. At the point of cleavage rearrangement of the cleaved segments occurs wherein a new disulfide linkage is formed at one part of the cleaved intermediate between the sulfur of the cleaved disulfide linkage of the chain extended polymer intermediate and the sulfur of the cleaved mercaptan group of the polymercaptan reactant. In the other part, at the point of cleavage, a new mercaptan group is formed between the other sulfur of the cleaved disulfide linkage of the chain extended polymer intermediate and the hydrogen atom of the cleaved mercaptan group of the polymercaptan reactant. Corollary reactions may also be written which occur between any mercaptan group of any of the product molecules of Reaction 2A and any other disulfide linkages of different molecules of such products or with disulfide linkages of the polyol reactant. In all, Reaction 2A provides mercaptan terminated product polymer molecules by a redistribution of molecular segments of the polymercaptan and chain extended polymeric intermediate and the molecular weight of which is dependent, according to the invention, upon the ratio of the number of equivalents of mercaptan of polymercaptan used to the number of equivalent weights of disulfide linkage of polyol used, to provide in the end liquid or easily meltable polythiopolymercaptan polymers of this invention. Redistribution of molecular segments is further aided by the disulfide-disulfide interchanges of Reaction 2B. Therein any two disulfide linkages of separate molecules cleave and reform with the cleaved portions of the different molecules thus to provide Products 2B.

Although the foregoing equations and descriptions tell of use of dimercaptan, diisocyanate and disulfide diol reactants in the instant process, the invention also contemplates the use of polymercaptans, polyisocyanates and disulfide-containing polyols wherein the prefix "poly" indicates numbers of respective reactive chemical groups that also are greater than 2 and at most about 4, and which numbers in the separate reactants may be the same or different. At any event, whatever the true reaction mechanisms may be, the process of the invention when pursued according to the instant teachings provides liquid or easily meltable polythiopolymercaptan urethane polymers that are oxidatively curable to useful solids, and which are characterized on the average by the presence

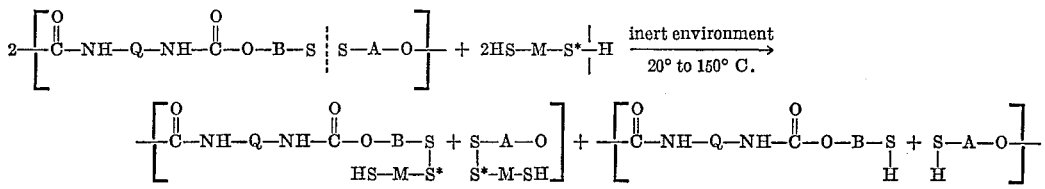

2B-disulfide interchange

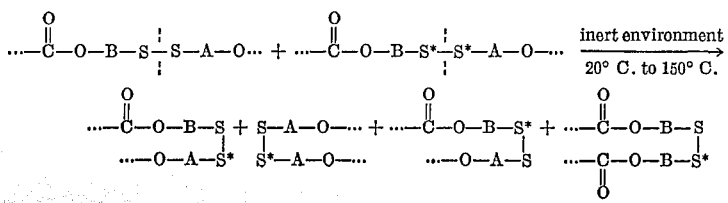

per molecule of at least one disulfide linkage, and a plurality of mercaptan groups and at least occasionally of at least one urethane linkage.

As may be clearly seen from the foregoing, the instant process does not involve or provide water or inorganic salts as reactants, wastes or reaction aids, and thus provides for substantial savings and economies over prior art methods to produce liquid or easily meltable and oxidatively curable polythiopolymercaptans.

Suitable disulfide polyols which may be used as reactants in the instant process conform generally to a structure such as

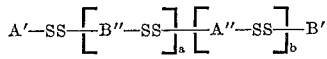

wherein A' and B' are monovalent organic groups which are otherwise nonalkaline and unreactive with isocyanate and thus inert, and which groups may be the same or different; however each of A' and B' contain at least one hydroxyl group and at most two. A'' and B'' are divalent organic groups which are otherwise nonalkaline and unreactive with isocyanate and thus inert, and which groups may be the same or different; however each of A'' and B'' may contain none, one or two hydroxyl groups and preferably contain no hydroxyl groups. The organic groups A', B', A'' and B'' are predominantly aliphatic, aromatic, alicyclic, alkaryl or aralkyl in nature, the carbon chains of which may occasionally be interrupted by a chalcogen atom, that is oxygen and/or sulfur, and/or by an olefinic linkage, viz. —CH=CH—, and may have pendant thereto alkyl groups or halogen atoms. The preferred A' and B' groups are alkyl, and the preferred A'' and B'' groups are alkylene in nature. The numbers $a$ and $b$ may be the same or different and may be zero or as great as 130. Among the typical disulfide polyols useful for present practice one may include those listed in Table II.

Table II

Mono(disulfide) diols

HO—$(CH_2)_m$—SS—$(CH_2)_n$—OH $m$ and $n=2$ to 10

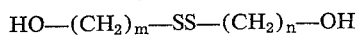

$m$ and $n=2$ to 10

HO—$(CH_2)_m$—(O—$CH_2)_n$—SS—$(CH_2)_m$—OH $m$ and $n=2$ to 10

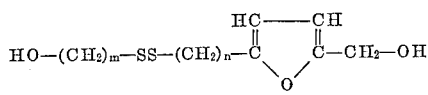

$m=1$ to 10, $n=2$ to 10

Mono(disulfide) triol

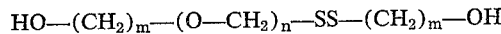

$m$ and $n=2$ to 10

Monodisulfide tetra-ol

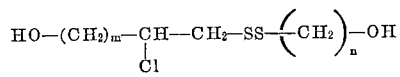

$m$ and $n=2$ to 10

Tri(disulfide) diol

HO—[$(CH_2)_m$—S—$CH_2$—S—$(CH_2)_n$—SS—
$(CH_2)_n$—S—$CH_2$—S]$_3$—$(CH_2)_m$—OH $m$ and $n=2$ to 6

Poly(disulfide) diol

HO—[$(CH_2)_m$—O—$(CH_2)_n$—SS—$(CH_2)_m$—
O—$(CH_2)_n$]$_a$—SS—$(CH_2)_m$—O—$(CH_2)_n$—OH $m$ and $n=2$ to 6, and $a=1$ to 50

The preferred disulfide-containing polyols include those formed from dithiodiglycol and/or dithiodipropanol which have molecular weights in the range of from about 500 to 5,000. Dithiodiglycol, viz.

$HOCH_2CH_2SSCH_2CH_2OH$ and/or dithiodipropanol, viz.

HO($CH_3$)CHCH$_2$SSCH$_2$CH(CH)OH and or other low molecular weight disulfide-containing polyols may be used as disulfide-containing polyol reactants in and of themselves, or be homo or copolymerized in ether chain extension to the preferred 500 to 5,000 molecular weight range by any of the well known methods, such as chain extension by reaction with alpha or beta epoxides like ethylene oxide, 1,3-butylene dioxide, epichlorohydrin, etc.; or they may be chain extended by polyetherification, or by "acetal" chain extension as in the reaction with an aldehyde or ketone, viz.

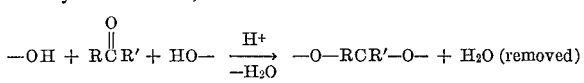

Suitable polyisocyanates which may be used as reactants in the instant process conform generally to a structure such as Q—(NCO)$_c$, wherein Q is as was previously defined, and the number $c$ may be 2, 3 or 4. The preferred polyisocyanates are diisocyanates, i.e., $c$ is 2. Typical of the useful polyisocyanates are the aromatic diisocyanates, e.g., the isomers of toluene diisocyanate, m-phenylene diisocyanate, 4-chloro-1,3-phenylene diisocyanate, 4,4'-biphenylene diisocyanate, and 1,5-naphthalene diisocyanate; and the aliphatic diisocyanates, such as 1,4-tetramethylene diisocyanate, 1,10-decamethylene diisocyanate, 1,4-cyclohexylene diisocyanate, 4,4'-methylene-bis(cyclohexyl isocyanate); and the alkaryl diisocyanates, e.g., 4,4'-methylene-bis(phenylene isocyanate). The reactive isocyanate groups may also be in a blocked or "masked" form, such as occurs when the isocyanate groups are reacted with a blocking or masking compound, provided that the then blocked isocyanate groups thus provided may subsequently be freed under the conditions of the process and be available to enter the process reactions and form the polymeric products of the invention.

Suitable polymercaptans which may be used as reactants in the instant process conform generally to the structure M—(SH)$_e$, wherein the molecular weight and the polyvalent organic group M are as were previously defined and $e$ is 2, 3 or 4. Among the typical polymercaptans useful for present practice, one may include those listed in Table III.

Table III

HS—$(CH_2)_n$—SH $n=2$ to 20

HS—[$(CH_2)_n$—S—$(CH_2)_p$—S—$(CH_2)_m$]$_q$—SH $q$ and $p=1$ to 20, $n$ and $m=2$ to 20

HS—[$(CH_2)_n$—O—$(CH_2)_m$]$_p$—SH $p=1$ to 20, $n$ and $m=2$ to 20

HS—[$(CH_2)_n$—O—$(CH_2)_p$—O—$(CH_2)_m$]$_q$—SH $q$ and $p=1$ to 20, $n$ and $m=2$ to 20

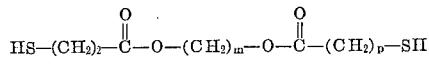

$n$, $m$ and $p=2$ to 20

$n$ and $m=0$ to 20

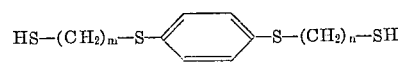

$m$ and $n=2$ to 20

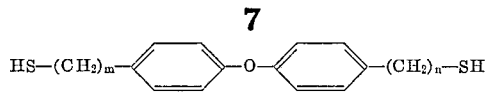

$n$ and $m = 1$ to 20

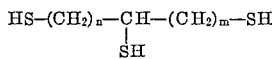

$n$ and $m = 1$ to 20

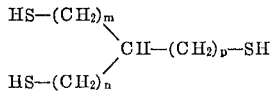

$m$, $n$ and $p = 1$ to 20

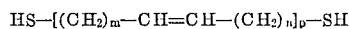

$n$, $m$ and $p = 1$ to 20

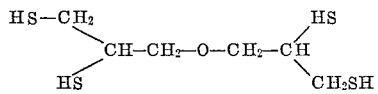

According to the invention, the ratio of isocyanate equivalents to hydroxyl equivalents used in the process is 1/1, and thus is such that if the urethane chain extension were permitted to go to completion it would, at least theoretically, provide a "nonending" urethane-disulfide-containing polymer molecule, which polymer undoubtedly would be a solid. Such a solid, however, would be difficult to admix and thus to cleave with polymercaptan, unless the two reactants, that is to say the chain extended urethane chain extended polydisulfide and polymercaptan, were masticated as on a rubber mill or in a Banbury mixer. This difficulty is not one of chemistry, but rather one of getting the mercaptan groups into physical proximity to, as in uniform and intimate contact with, the disulfide linkages of such a solid polymer so as to permit mercaptan-disulfide and disulfide-disulfide interchange Reactions 2A and 2B to occur. Therefore, it is preferred for the purposes of handling ease and economies in practicing the instant process to mix the polymercaptan with other reactants while the reaction and product mixture is still in a liquid state at the temperature of reaction. Thus, in the most preferred embodiments of the invention the polymercaptan may be added to the disulfide-containing polyol or vice versa, and/or added to the polyisocyanate or vice versa either before, at the same time as, or subsequent to the addition of the third type of reactant; but, in any instance, the reactants are in admixture preferably while the system is still liquid. This may also be achieved by dissolving all reactants in an inert solvent. The polymercaptan, indeed, may be premixed with either the polyisocyanate or alternately with the disulfide polyol and stored as such prior to admixture with the third type of reactant, i.e., with the disulfide-containing polyol or the polyisocyanate, respectively.

In the absence of base or any other alkaline substance, the polymercaptan and polyisocyanate reactants either will not coreact under the conditions of the instant process, or coreact at so very slow a rate as to be negligible. In substance, no thiourethane linkages are formed under the conditions of the present process. This fact is crucial to the successful practice of the invention, wherein substantially all mercaptan groups are made available for mercaptan-disulfide interchange, as in Reaction 2A, and thus to produce the polymer product which contains substantially the same number of equivalents of mercaptan as that added by means of the polymercaptan reactant. Further, this fact of nonformation of thiourethane makes it possible for a practitioner merely from a knowledge of the reactants used, that is to say their chemical structures and their respective relative quantities and when used in the range of critical ratios as set out herein, to prescribe be-forehand and to prepare liquid or easily meltable polymers of this invention having specific average molecular weights.

The use of a polymercaptan in the instant process is essential to practice the invention, for it (1) provides all polymer product molecules with a plurality of mercaptan terminals permitting them to be oxidatively cured, and (2) enables the practitioner to prescribe the average molecular weight of the polymer product. The instant process employing the polymercaptan provides for certain unusual results; namely, it provides that the total number of equivalents of mercaptan from reactant polymercaptan to polymer product is not changed by the process, that is to say that the polymer products obtained in the process have exactly the same number of mercaptan equivalent weights therein as the number of mercaptan equivalent weights of polymercaptan reactant that is used in their preparation. Another unusual result is that the number of disulfide groups from disulfide polyol reactant to polymer product is not changed by the process, that is to say that in gross view the number of equivalents of disulfide linkages present in the polymer products is exactly the same as the number of equivalents of disulfide linkages present in the disulfide-containing polyol reactants employed in their preparation. The cleavage or splitting and subsequent reforming reactions of mercaptan-disulfide and disulfide-disulfide interchange make it possible to split the reactants and in so doing rearrange the cleaved portions of the reactant molecules so as to invariably produce in the end mercaptan terminated polymers of the invention of a prescribable average molecular weight.

Prescribability of the average molecular weight by means of the instant process may readily be seen. For example, to prepare a polymer of the invention having an average molecular weight of about 4,000, and which has an oxaformal, i.e., gem diether . . .

. . . repeating unit backbone, one would prescribe as the disulfide-containing polyol reactant one containing at least one oxaformal linkage of less than 4,000 molecular weight. The structure of such a polyol for instant purposes should be known and for this discussion is the diol

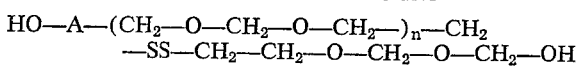

of 1,000 molecular weight, which contains one equivalent of disulfide linkage. According to the process, the polyol is admixed with a polyisocyanate and a polymercaptan at 20° C. to 150° C. until all hydroxyl and isocyanate groups have disappeared. The reactant for the purposes of the present discussion are the diisocyanate Q–(NCO)$_2$ of known structure and 200 molecular weight, and the dimercaptan M—(SH)$_2$ also of known structure and 200 molecular weight. The quantities of polyisocyanate used according to the invention are such as to provide a ratio of equivalents of isocyanate of the polyisocyanate to equivalents of hydroxyl of the polyol of 1/1. Thus to calculate the number of mercaptan equivalents of polymercaptan per disulfide equivalent of polyol that is used to provide a polymer of 4,000 average molecular weight, the following are considered. A unit of the exemplary urethane chain extended polymer intermediate which is formed thus would comprise a structure

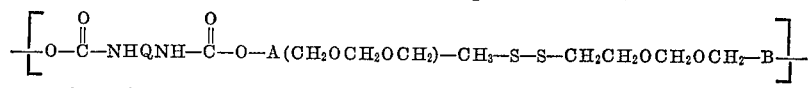

and would have a unit weight equal to the sum of the molecular weights of the polyol and polyisocyanate, or 1,200. The ratio of equivalents of mercaptan of the polymercaptan reactant to equivalents of disulfide linkage of the polyol reactant in this case is 2/1. Thus, on the average, each unit of the urethane chain extended polymer can be cleaved once, that is to say, into two parts each part having a weight of K and K′ respectively, where $K+K'$ is 1,200. Each of the adjacent and conjoined units of the urethane chain extended polymer intermediate also on the average would be cleaved once into K and K' parts. In reaction with the polymercaptan any K part may be joined with the mercaptan split polymercaptan to reform a disulfide linkage, and this part would thus have a weight of $K+199$ and be mercaptan terminated; the K' part remaining would be conjoined to the hydrogen residue of the polymercaptan's split mercaptan group, to form a terminal mercaptan group, and thus have a weight of $K'+1$. But the $K+199$ part of one unit may be linked to either a $K'+1$ or a $K+199$ parts of its adjacent unit of the urethane linked disulfide polymer intermediate, and the $K'+1$ part of the cleaved unit also may be linked to either a $K'+1$ or a $K+199$ part of its adjacent unit. Thus in overall view one forms dimercaptan terminated molecules of overall average molecular weight, W, of $$2[K'+1]+2[K+199]+[K'+1]+[K+199]$$

which sum when divided by 3 accounts for the three possible types of molecules formed and provides an average $W=1,400$. Thus from the invention one knows that each equivalent of mercaptan per equivalent of disulfide linkage, for the system in example, will provide in average molecules of 1,400 molecular weight. This system is denoted as system L. Therefore, on the average, one must use less than the one equivalent of polymercaptan per equivalent of polyol to obtain a 4,000 molecular weight polymer. This system is denoted as system L'. According to the invention, in two systems designated L and L', the ratio of the number of equivalents of mercaptan used in system L per disulfide equivalent of polyol to the number of equivalents of mercaptan used in system L' per disulfide equivalent of polyol is directly proportional to the inverse ratio of their molecular weights, or $$\frac{\text{molecular weight of polymer formed in } L'}{\text{molecular weight of polymer formed in } L}$$

Thus to provide a 4,000 average molecular weight polymer, $1/X=1,400/1,400$, or X mercaptan equivalents of polymercaptans$=1,400/4,000$. Thus 0.35 mercaptan equivalent of the exemplary polymercaptan reactant is needed to obtain an exemplary polymer of 4,000 average molecular weight. If substantially the same systems L and L' were used, but therein the polyol of 1,000 molecular weight which is used contained two disulfide linkages, or two equivalents of disulfide occurred per repeating unit of the urethane chain extended disulfide polymer intermediate, when every two disulfide linkages, thereof is split it produces three segments called K, K', and K'' segments per unit, and which weigh in sum 1,200. Each of the K and K'' segments, that is to say the terminal segments of the unit are joined to a K or K'' segment from the cleaved adjoining units to provide, on the average, two types of molecules per unit weight of the polymer, one of segment K', the internal segment that is devoid of any urethane linkage, the other a $[K+K]$, $[K''+K]$, or $[K+K'']$ terminal segment which contains on the average one urethane linkage. Each of these two types of molecules provided however are mercaptan terminated by the mercaptan-disulfide interchange reaction together, in gross view, when taking into account the multitude of segment cleavages and interchanges, the polymer product molecules for the L system have an average molecular weight which is but one half the unit weight of the intermediate polymer plus the molecular weight of the polymercaptan or $600+200$, i.e. 800. Thus, with these L and L' systems, to obtain polymers of average molecular weight of 4,000, one again applies the ratio taught by the invention, i.e., $1/X=4,000/800$. Therefore, the number of mercaptan equivalents of polymercaptan to be used for the L' system is 0.2 per disulfide equivalent of polyol reactant to obtain the desired polymer of 4,000 average molecular weight.

From the foregoing analyses, it is evident that occasionally some molecules are formed in the process which are devoid of disulfide linkages, that is wherein the closest disulfide linkages of the intermediate polymer are split and the inner sulfur atoms thereof are joined to hydrogen atoms of split mercaptan groups of the polymercaptan merely to form terminal mercaptan groups but no disulfide linkages in the product. The polymercaptan molecules so formed, according to the process, however immediately enter into other mercaptan-disulfide interchange reactions to form other polymer molecules having disulfide linkage; and so in the end, the probability of more than a minute number of molecules being present at equilibrium in the present process which contain no disulfide linkages is minute.

The critical ratios of 1/130 to 4/1 equivalents of polymercaptan reactant to equivalents of disulfide containing polyol are taught, according to the invention, to provide polymers of the invention which are in the average molecular weight range of 1,000 to 15,000. If a ratio of less than 1/130 is used, polymers of greater average molecular weight than 15,000 are invariable obtained, and if a ratio greater than 4/1 is used, the polymercaptan reactant is present in innocuous excess. The 4/1 ratio assumes use of a tetramercaptan reactant, for a trimercaptan the ratio is 3/1 and for a dimercaptan the ratio is 2/1. In the instance of excess mercaptan, however, the invention and its utility are not comprised, for the net excess of polymercaptan reactant that is present after the formation of the instant polymers will, during subsequent oxidative curing reactions, merely react with other mercaptan terminals of the instant polymer products of the invention as crosslinking or chain extending moieties therefor. Indeed, when such extra crosslinking or chain extension is desired in curing reactions, one may purposely either charge polymercaptan initially to provide a ratio in excess of the 4/1, 3/1, or 2/1 ratio, or one may subsequent to a 4/1, 3/1, or 2/1 ratio formation of polymer, then add excess polymercaptan to achieve specific cure properties.

Prescribability of average structure of the polymer products of the present invention also is achieved by the instant process. Knowing the chemical structure of the reactants, according to the teachings herein one immediately knows the unit structure of the urethane chain extended disulfide polymer intermediate. Knowing the average molecular weight of polymer product desired, by calculation one may determine by the invention's prescription the number of equivalents of polymercaptan reactant needed per equivalent of polyol reactant to obtain a specific average molecular weight. Thus, on the average, one may know into how many parts the unit polymeric structure is divided, or on the averge how many of the disulfide linkages therein are cleaved. Thus the structures of the polymer product molecules between any two disulfide linkages, within or between any units in the chain extended polymer intermediate are immediately known, and how they combine together and with polymercaptan.

The invention also contemplates use of mixtures of more than one disulfide-containing polyol, polyisocyanate and/or polymercaptan reactants of the types defined herein.

In pursuing the instant process inert organic solvents, i.e. nonbasic solvents devoid of active hydrogen as defined by the Zerewitinoff method, although not essential to practice the process may be used as reaction aids to promote better contact among the reactants. Typical solvents useful in this regard include hydrocarbons such as nonane, decane, benzene and toluene, chlorinated hydrocarbons such as $CCl_4$, $CHCl_3$, $Cl_2C=CCl_2$, $ClCH=CCl_2$, $ClCH_2-CH_2Cl$, $Cl_3C-CCl_3$, chlorinated phenylethers, oxahydrocarbons such as ketones, ethers, furane, dioxane, esters, diesters, triesters, polymeric ethers, siloxane oils etc. Effective reaction temperatures for conducting the present process extend from common room temperatures, i.e., 20° to 50° C., up to about 150° C. In order to effect better contact among the reactants, and their intimate admixture, stirring or an agitation of the reactants may prove desirable.

The following examples present embodiments and modes of practice of the invention, but are not intended to limit its scope, for many changes in reactants, their ratios, and process conditions may readily be made by those skilled in the art and still fall within the purview of the present teachings and the claims.

EXAMPLE 1

At 50° C., one mol of a disulfide-containing diol, derived from the polyetherification of dithiodiglycol, of approximately 500 average molecular weight and having the structure $H\text{-}(O\text{---}CH_2CH_2SSCH_2CH_2)_n OH$, one mol of toluene diisocyanate, and 0.5 mol of ethylene dimercaptan, $HSCH_2CH_2SH$, are admixed under dry nitrogen in an otherwise inert environment until the reaction mixture shows no evidence of isocyanate or hydroxy remaining. Admixture is continued for about one hour, thus, to provide a dimercaptan polymer product of the invention with the average structure $$HS\text{---}CH_2CH_2S\text{---}\left[\left(S\text{---}CH_2CH_2OCH_2CH_2S\right)_{\frac{n-1}{2}}SCH_2CH_2\text{---}O\overset{O}{\underset{\|}{C}}\text{---}NH\text{---}Q\text{---}NH\overset{O}{\underset{\|}{C}}\text{---}O\text{---}CH_2CH_2S\left(SCH_2CH_2OCH_2CH_2S\right)_{\frac{n}{2}}\right]_2 H$$

and an average molecular weight of about 1,450. The reaction mixture initially contains a ratio of 1/1 equivalents of isocyanate to hydroxyl, and a ratio of about 1/3.5 of mercaptan equivalents of polymercaptan to disulfide equivalents of polyol. The liquid polythiopolymercaptan polymer product obtained is cured to a rubber by admixture with 10 parts of $Sb_2O_5$ per 100 parts by weight of polymer with heating at 100° C. for two hours.

EXAMPLE 2

At 100° C. a premixed dry toluene solution containing 2 mols of 1,3,6-hexamethylene triisocyanate, of 209 molecular weight, and 3 mols of the disulfide-containing diol of the structure $$\left[\text{---}O\overset{CH_3}{\underset{|}{C}}HCH_2SSCH_2\overset{CH_3}{\underset{|}{C}}H\text{---}OCH_2\text{---}\right]_n\text{---}OH$$

formed by condensation reaction of dithiodipropanol with formaldehyde, and of approximately 1,000 average molecular weight, is admixed under inert conditions with 0.25 mol of a tetramercaptan of the structure $$HS\text{---}CH_2\text{---}CHCH\text{---}CH_2\text{---}CH\text{---}CH_2CH_2SH$$
$$\phantom{HS\text{---}CH_2\text{---}CH}\underset{SH}{|}\phantom{CH\text{---}CH_2}\underset{SH}{|}$$

and 303 molecular weight, to provide a 1/1 ratio of equivalents of isocyanate/hydroxyl and a 1/30.6 ratio of mercaptan equivalents to disulfide equivalents, until all isocyanate and hydroxyl groups disappear. Admixture is continued at 100° C. for about one hour. At the end of this time, the toluene solvent is distilled from the product mixture to leave behind an easily meltable oxidatively curable polythiopolymercaptan polymer of this invention which has an average molecular weight of about 3,500.

EXAMPLE 3

To produce a polymer of the invention of about 15,000 molecular weight with a structure similar to that obtained in Example 1. One proceeds as in Example 1, but uses therein about 0.05 mol or 0.1 mercaptan equivalent of ethylene dimercaptan, and thus obtains an easily meltable dimercaptan poly(disulfide) polymer of the invention having an average molecular weight of approximately 14,500.

I claim:
1. A process for producing curable liquid polymers which comprises reacting, at a temperature in the range from about 20° C. to about 150° C. and in a substantially inert environment,

(a) a disulfide-containing polyol having a molecular weight in the range from 150 to 15,000 and characterized by the formula $$A'\text{---}SS\text{---}[B''\text{---}SS\text{---}]_a[\text{---}A''\text{---}SS\text{---}]_b\text{---}B'$$

in which $A'$ and $B'$ each represent monovalent organic groups containing from 1 to 2 hydroxy groups, $A''$ and $B''$ each represent divalent organic groups containing from zero to 2 hydroxy groups, and $a$ and $b$ each represent integers in the range from zero to 130, (b) a polyisocyanate having a molecular weight in the range from about 150 to about 1,000 and characterized by the formula $Q\text{---}[NCO]_c$, in which Q represents a polyvalent organic group, and $c$ is an integer in the range from 2 to 4, and (c) a polymercaptan having a molecular weight in the range from about 90 to about 1,000 and characterized by the formula $M\text{---}[SH]_e$, in which M is a polyvalent organic group, and $e$ is an integer in the range from 2 to 4, using quantities such that the ratio of hydroxy equivalents to isocyanate equivalents is 1:1 and the ratio of mercaptan equivalents to disulfide equivalents is in the range from 4:1 to 1:130, thereby forming a polymer which is liquid at 100° C. and which is capable of being oxidatively cured to a solid elastomeric polymer.

2. A process according to claim 1, in which the disulfide-containing polyol is selected from the group consisting of mono(disulfide) diols, mono(disulfide) triols, mono(disulfide) tetraols, di(disulfide) diols, tri(disulfide) diols, and poly(disulfide) diols.

3. A process according to claim 1, in which the polyisocyanate is selected from the group consisting of aromatic diisocyanates, aliphatic diisocyanates, and alkaryl diisocyanates.

4. A process according to claim 1, in which the polymercaptan is selected from the group consisting of:

(i) polymercaptans having the formula $$HS\text{---}(CH_2)_n\text{---}SH$$

in which $n$ is an integer from 2 to 20;

(ii) polymercaptans having the formula $$HS[(CH_2)_n\text{---}S\text{---}(CH_2)_p\text{---}S\text{---}(CH_2)_m]_q\text{---}SH$$

in which $n$ and $m$ each represent integers in the range from 2 to 20, and $q$ and $p$ each represent integers in the range from 1 to 20;

(iii) polymercaptans having the formula $$HS\text{---}[(CH_2)_n\text{---}O\text{---}(CH_2)_m]_p\text{---}SH$$

in which $n$ and $m$ each represent integers in the range from 2 to 20, and $p$ represents an integer in the range from 1 to 20;

(iv) polymercaptans having the formula $$HS\text{---}[(CH_2)_n\text{---}O\text{---}(CH_2)_p\text{---}O\text{---}(CH_2)_m]_q\text{---}SH$$

in which $n$ and $m$ each represent integers in the range from 2 to 20 and $p$ and $q$ each represent integers in the range from 1 to 20;

(v) polymercaptans having the formula $$HS\text{---}(CH_2)_n\text{---}\overset{O}{\underset{\|}{C}}\text{---}O\text{---}(CH_2)_m\text{---}O\text{---}\overset{O}{\underset{\|}{C}}\text{---}(CH_2)_p\text{---}SH$$

in which $n$, $m$ and $p$ each represent integers in the range from 2 to 20;

(vi) polymercaptans having the formula

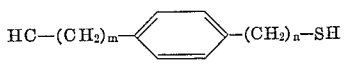

in which $n$ and $m$ each represent integers in the range from zero to 20;

(vii) polymercaptans having the formula

in which $m$ and $n$ each represent integers from 2 to 20;

(viii) polymercaptans having the formula

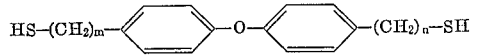

in which $m$ and $n$ each represent integers in the range from 1 to 20;

(ix) polymercaptans having the formula

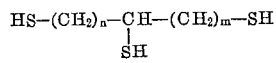

in which $n$ and $m$ each represent integers in the range from 1 to 20;

(x) polymercaptans having the formula

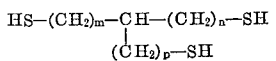

in which $n$, $m$ and $p$ each represent integers in the range from 1 to 20;

(xi) polymercaptans having the formula $$HS-[(CH_2)_m-CH=CH-(CH_2)_n]_p-SH$$

in which $n$, $m$ and $p$ each represent integers in the range from 1 to 20; and (xii) di-(2,3-dimercaptopropyl)ether.

References Cited

UNITED STATES PATENTS 3,169,119   2/1965   Dankert et al.

JAMES A. PATTEN, *Primary Examiner.*

L. ARNOLD THAXTON, *Assistant Examiner.*

U.S. Cl. X.R.

260—75, 77.5, 468, 482, 347.2

UNITED STATES PATENT OFFICE
CERTIFICATE OF CORRECTION

Patent No. 3,440,273　　　　　　　　　　　　　　　　April 22, 1969

Eugene R. Bertozzi

It is certified that error appears in the above identified patent and that said Letters Patent are hereby corrected as shown below:

Column 2, line 54, "dsulfide" should read -- disulfide --; line 55, "wtih" should read -- with --; line 66, "urethnae" shou read -- urethane --. Column 3, the formula after the Type I formula, but before line 45, the words -- Type 1, Product -- should be inserted. Column 5, Table II, after the formula under "Monodisulfide Tetra-ol", but before the words "Tri(disulfide)-diol", insert the following:

Di(disulfide) Diol $$HO-[(CH_2)_m-O-(CH_2)_n-SS-(CH_2)_n-O]_2-(CH_2)_m-OH, \text{ m and n} = 2 \text{ to } 10$$

Column 6, line 8, that portion of the formula reading "(CH)OH" should read -- (CH$_3$)OH --; in Table III, that portion of the formula on line 65 reading "(CH$_2$)$_2$" should read -- (CH$_2$)$_n$ --. Columns 7 and 8, after line 64, that portion of the formula reading "CH$_3$" should read -- CH$_2$ --. Column 10, line 52, "averge" should read -- average --. Column 11, after line 41, that portion of the formula reading "{" should read -- H{ --.

Signed and sealed this 5th day of May 1970.

(SEAL)
Attest:

EDWARD M. FLETCHER, JR.　　　　　　　　　　WILLIAM E. SCHUYLER, JR.
Attesting Officer　　　　　　　　　　　　　　Commissioner of Patents